Oct. 1, 1963    R. E. PETERSON    3,105,530
GUARD FOR A CIRCULAR TABLE SAW
Filed Oct. 23, 1961    3 Sheets-Sheet 1
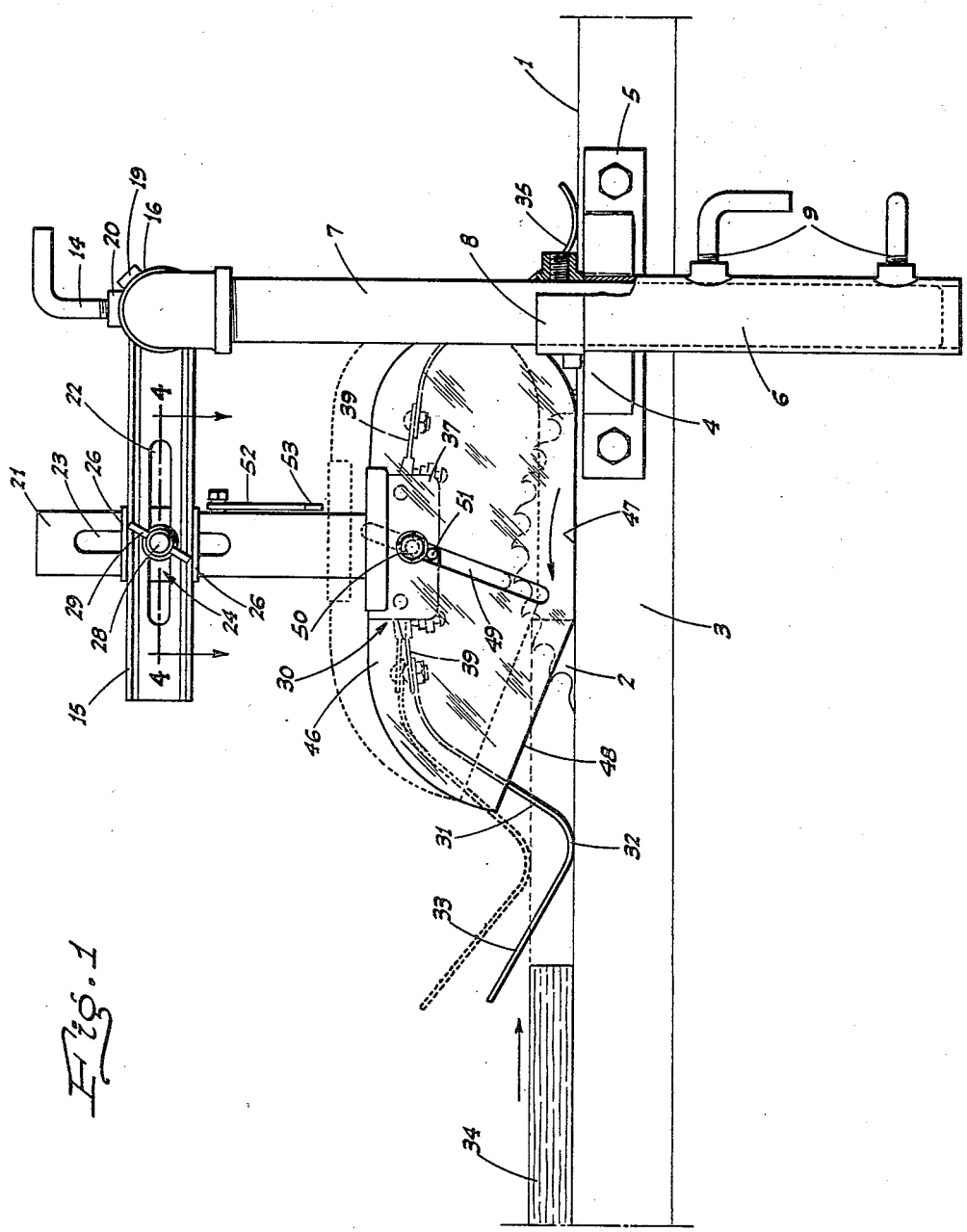
INVENTOR.
R. E. Peterson
BY
Webster & Webster
ATTYS.

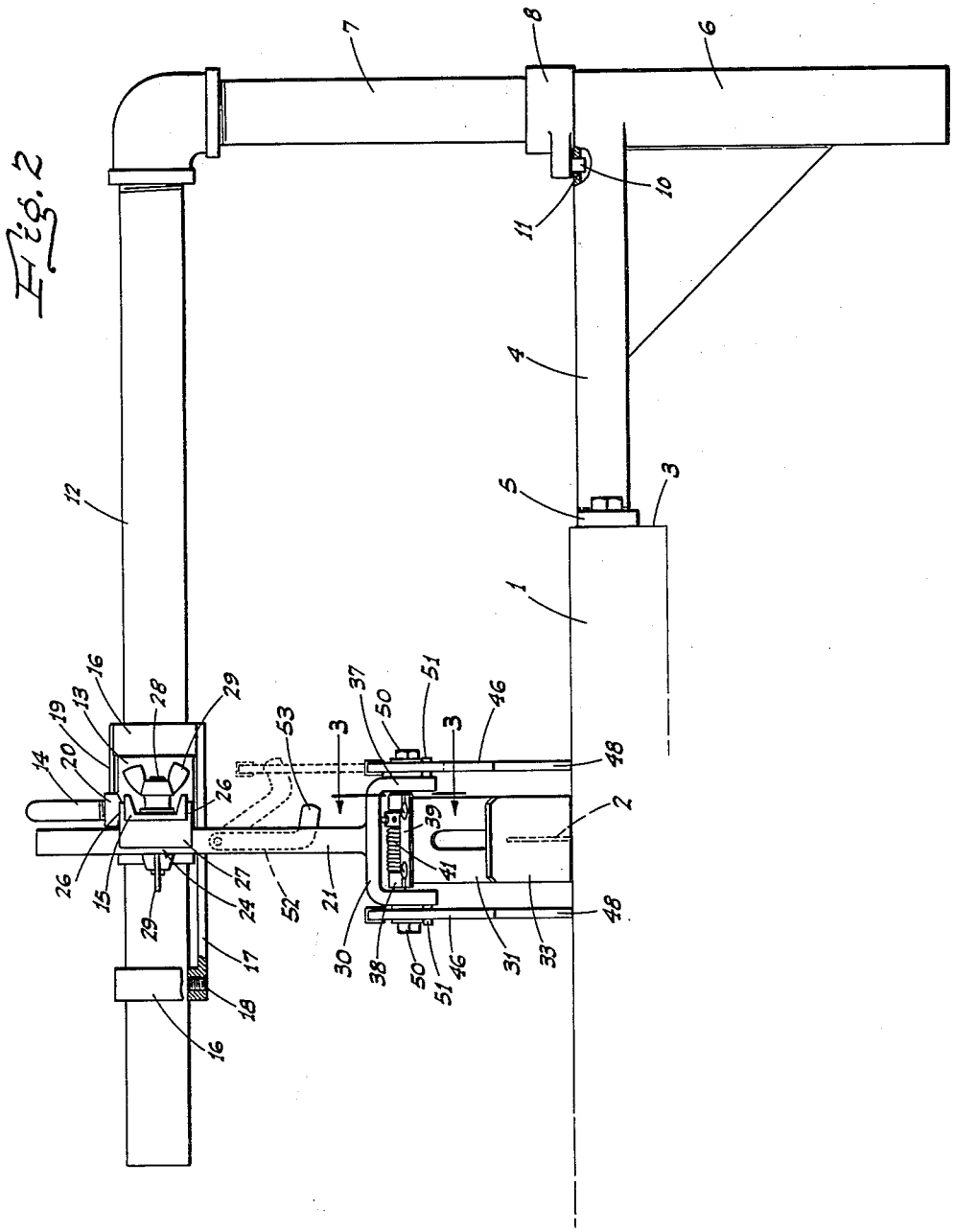

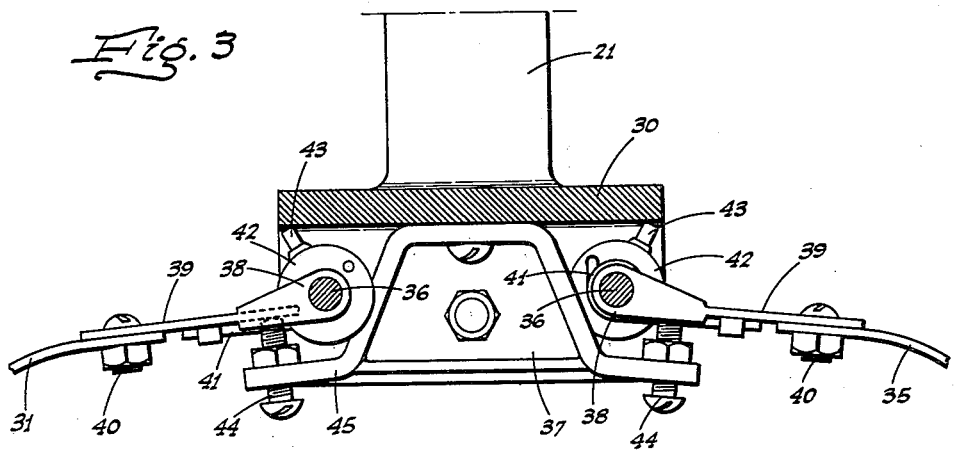
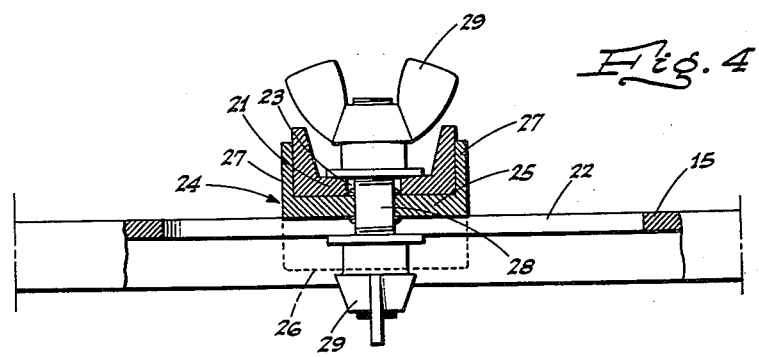
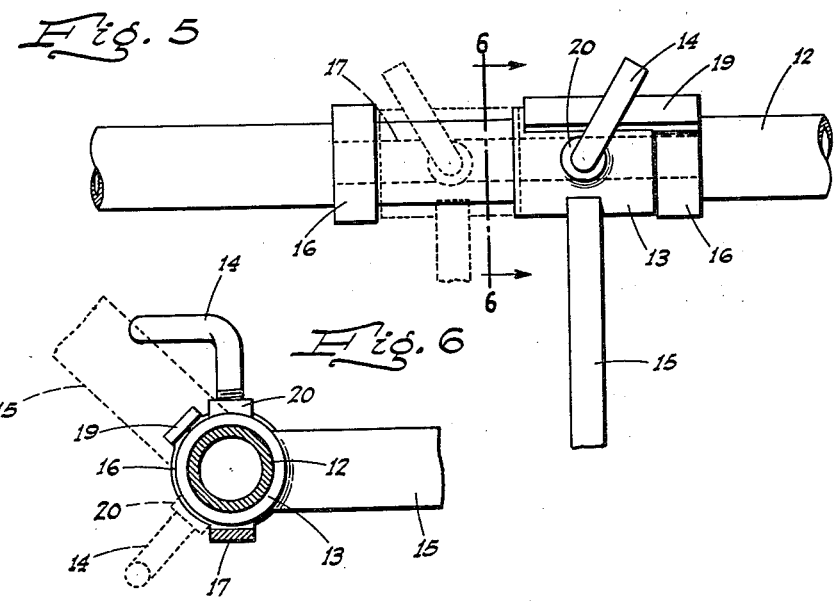

United States Patent Office 3,105,530
Patented Oct. 1, 1963

3,105,530
GUARD FOR A CIRCULAR TABLE SAW
Russell E. Peterson, Rte. 4, Box 170, Turlock, Calif.
Filed Oct. 23, 1961, Ser. No. 146,850
3 Claims. (Cl. 143—159)

This invention relates to saw guards, and particularly to one adapted for use with circular table saws.

A major object of the invention is to provide a saw guard for the purpose which will effectively protect the operator against possible contact with the saw from any angle or position when a piece of work is engaged with the saw, as well as when the saw is turning free.

A further object of the invention is to provide a mounting structure for the guard arranged so that such guard may be instantly swung and held clear of the saw whenever desired, or entirely removed from its base on the table, without any adjustments of any kind having to be made when the guard is returned to its operative position.

Other objects of the invention are to provide a saw guard which provides for the visibility of the work as it is being cut; one which prevents the work as it passes through the saw from being raised by centrifugal force so that an important anti-kickback feature is provided; one which is of assistance for all dado work; and one which incorporates safety for the operator in all features.

Still another object of the invention is to arrange the mounting means for the saw guard unit so that no structural changes are required in adapting the unit for use on table saws of different sizes and forms.

An additional object of the invention is to provide a saw guard which is designed for ease and economy of manufacture.

It is also an object of the invention to provide a practical, reliable, and durable saw guard, and one which will be exceedingly effective for the purpose for which it is designed.

These objects are accomplished by means of such structure and relative arrangement of parts as will fully appear from a perusal of the following specification and claims.

In the drawings:

FIG. 1 is a side elevation of the saw guard as mounted in operative position.

FIG. 2 is a front elevation of the guard.

FIG. 3 is an enlarged fragmentary longitudinal section on line 3—3 of FIG. 2.

FIG. 4 is a fragmentary enlarged sectional plan on line 4—4 of FIG. 1.

FIG. 5 is a fragmentary enlarged top plan view of the transverse mounting arm and the longitudinal guard supporting bar mounted thereon.

FIG. 6 is a cross section on line 6—6 of FIG. 5.

Referring now more particularly to the drawings, and to the characters of reference marked thereon, the numeral 1 indicates generally the flat table of a table saw, from which table a rotary saw 2 projects upwardly from below as usual, with the saw in parallel relation to one side edge 3 of the table.

The improved guard structure comprises a horizontal base bracket 4 projecting laterally out from said side edge 3. This bracket includes a bar 5 adapted to be bolted against the edge 3, and a sleeve 6 fixed on and depending from the outer end thereof. The bracket is mounted so that the sleeve 6 is disposed in a transverse plane a short distance beyond or to the rear of the center of the saw, as indicated in FIG. 1.

Inherently slidable and turnable in the sleeve 6 is a standard 7 having a collar 8 adjustably secured thereon intermediate its ends and engaging the upper end of sleeve 6 and limiting downward movement of the standard therein. Set screws 9 prevent upward movement of the standard, while rotation thereof is positively prevented by a locating dowel 10 fixed with the collar to one side of the same and releasably seated in an orifice or seat 11 in the top wall of bracket 4, as indicated in FIG. 2.

Projecting across the table from and rigid with the upper end of standard 7 is a mounting arm 12 of circular form in section; this arm being of sufficient length to extend some distance laterally beyond the saw, as shown in FIG. 2.

Slidable and turnable on the arm 12 is a short sleeve 13, normally held against such movement by a hand set screw 14. A horizontal extension or supporting bar 15 projects forwardly from sleeve 13 in parallel relation to the saw 2 and some distance above the same. This bar 15 supports the saw guard unit itself, as will be hereinafter described.

As shown particularly in FIGS. 2 and 5 the sleeve 13 is confined for limited movement along the arm 12 between spaced collars 16 connected as a unit by a bottom bar 17 which of course clears said sleeve. Said unit is adjustably held in any suitable fixed position on the arm 12 by a set screw 18 in each collar 16 (see FIG. 2). A stop bar 19 projects from one collar 16 adjacent the top thereof toward but terminates short of the other collar 16, and in overlying relation to the normal or operating position of said sleeve 13 and bar 16. When the sleeve 13 is thus positioned its rotation, in a rearward direction so that the bar 15 will be lifted, is practically nil, since stop bar 19 is quite close to and in the path of the upstanding boss 20 in which the set screw 14 is mounted, as shown in FIG. 6.

If, however, the sleeve 13 is slid along the arm 12 until the boss 20 is beyond the stop bar 19, said sleeve and all parts connected thereto can be swung upwardly until the boss 20 contacts the lower collar connecting bar 17. The purpose of this feature will be disclosed later.

The length of bar 15 is such that it will extend a short distance beyond the center of the saw 2, as shown in FIG. 1. Said bar 15 is preferably of channel form in section, for lightness combined with strength, and thus has one flat side, as shown.

Depending from said bar 15 on the flat side of the same is a post 21 of the same cross-sectional form as the bar 15, and thus also having a flat side which faces the flat side of the bar 15. Said bar 15 is formed with a longitudinal slot 22 in the bottom of the channel, while the post 21 has a similar slot 23.

The bar 15 and post 21 are connected in right angle relation, while allowing of independent vertical adjustment of the post relative to said bar, or horizontal adjustment of said post along the bar, by means of a saddle and clamping unit 24. This unit comprises a base plate 25 between the bar and post (see FIG. 4); flanges 26 slidably engaging the upper and lower edges of the bar 15, and flanges 27 slidably engaging the front and back edges of the post 21.

A double-ended stud 28 rigid with the plate 25 projects through the slots 22 and 23, said stud having wing nuts 29 thereon to independently clamp the bar 15 and post 21 against the base plate 25 of the unit 24.

An inverted channel bracket 30 is secured on the lower end of the post 21 so as to extend parallel to saw 2, the bar 15 and post 21 being set so that said bracket will be some distance above the saw and in transversely centralized relation thereto when the bar-mounting sleeve 13 is in the operative position on arm 12, as previously described.

A spring strip 31, forming the forward saw guard, depends and projects forwardly from bracket 30 centrally of the width thereof and so as to clear the saw;

said strip, intermediate its ends, being formed with a short, upwardly concavely curved portion 32 followed by an upwardly and forwardly projecting terminal extension 33 of sufficient length such that its end, when portion 32 is resting on or is closely adjacent the table 1, will be above the upper level of any board 34 or other piece of work to be cut and resting on the table, as shown in FIG. 1.

Another spring guard strip 35 depends and projects rearwardly from the bracket; said strip 35 being similar in form to strip 31 but lacking the extension 33 thereof.

Both strips 31 and 35 are separately mounted on the bracket 30 by identical means, and a description of one such means will therefore suffice for both. For strip 31, for instance, the mounting means comprises a cross pin 36 (FIG. 3) counted in the sidewalls 37 of bracket 30. Transversely spaced ears 38 are turnable on the pin 36; said ears being rigid with a short plate 39 which overlaps the upper end of the guard strip 31 and is secured thereto by suitable means such as bolts 40.

A helical torque spring 41 is mounted on pin 36 between the ears 38; said spring at one end projecting under and being secured against plate 39 and at the other end being secured to a rotatably adjustable disc 42 on pin 36.

Rotation of the disc from any set position, and which would allow the spring to unwind and lose tension, is prevented by means of a pin 43 projecting from the periphery of the disc and placeable in any one of a number of circumferentially spaced sockets in the disc. This pin 43 engages the under side of the base of the bracket channel, as shown in FIG. 3.

The spring 41 is arranged to exert pressure on plate 39 in a direction to force said plate, and the strip 31, downwardly; said spring thus resisting upward movement of said strip.

The downward movement of the plate 39 and strip 31 is adjustably limited by means of a set or stop screw 44 normally engaging the under side of plate 39. This screw is mounted in the lower end portion of an auxiliary narrow bracket 45 which extends upwardly to the base of bracket 30 centrally between its ends. When the guard unit is in its operative position the set screws 44 of the two guard strips are adjusted so that said strips will just contact, or are immediately adjacent, the face of table 1.

In addition to the end guard strips 31 and 35, the bracket 30 supports side guards 46 on the outside thereof; these side guards being of plate form and preferably made of relatively light but stiff transparent material such as "Plexiglas." Each side guard is of generally elongated form; the lower edge of the guard including a straight portion 47 normally resting on the table top, and an upwardly sloping portion 48 projecting forwardly from the forward end of the edge portion 47 to a termination above the level of the work piece 34, as shown in FIG. 1.

An upstanding elongated slot 49, having an upward slope to the rear, is cut through the guard 46 and receives a mounting bolt 50 therethrough, said bolt being secured in and projecting from the adjacent sidewall 37 of bracket 30. The bolt has a loose fit in slot 49 so that the guard plate 46 can freely move up and down while being held from escape; such movement being guided by means of a pin 51 projecting from said sidewall 37 and through the slot 49 below the bolt 50.

The width of the bracket 30, and consequently the spacing between the side guards 46, is sufficient to enable a narrow strip of work to be passed through the saw without raising said side guards from the table. Also, since the side guards are independently movable, a piece of work may possibly engage and lift one side guard only, leaving the opposite guard in an operator-protecting position.

A latch finger 52 is pivoted on the rear face of the post 21, said finger having a lower end, laterally projecting latch element 53 to engage in the slot 49 of one of the side guards 46. This guard is the one which is on the side of the guard unit opposite that to which said unit may be moved along arm 12 from its operative position between the collars 16, as previously described. As indicated in FIG. 2, the latch finger is positioned so that element 53 can engage in slot 49 only after the guard 46 has been lifted sufficiently to clear the saw 2.

The purpose of this is to enable the guard unit as a whole to be shifted laterally along arm 12 to a position such that the guard unit may be swung upwardly and back to a self-holding position out of the way, as indicated generally in the dotted lines in FIG. 6, when it is desired to change saw blades, or clean off the table.

Upon loosening the set screws 9 and lifting up the standard 7 so that dowel 10 clears the bracket 4, said standard, and all parts connected thereto, may be swung to an out-of-the-way position of the guard unit; or said standard may be entirely withdrawn from the sleeve if the use of the guard is not desired for certain operations. At the same time, when the standard is replaced in the sleeve and lowered so that the dowel 10 reengages the seat 11 in the bracket 4, the saw guard unit will be returned to its original saw-guarding position without any adjustments having to be made.

Previously made adjustments of the collar 8 on the standard 7, of the post 21 vertically or horizontally along the arm 15, or of the guard unit 16 along arm 12, are not then affected when having been once made for any particular table saw installation—being for the purpose of adapting the structure for use with table saws of various forms and sizes without any structural changes being required.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A guard structure for a circular table saw which projects upwardly from the table a predetermined distance from one edge of the table, said structure including a guard unit over the projecting portion of the saw, and means supporting the unit from the table; said means comprising a bracket mounted against one side edge of the table in longitudinally spaced relation to the axis of the saw, a standard upstanding from the bracket, a cross arm projecting across the table from the upper end of the standard, a bar projecting lengthwise of the table past the arm in a plane laterally adjacent said saw, means supported by and depending from the bar to a connection with the guard unit, and means mounting the standard on the bracket for rotation relative thereto, removal therefrom, and vertical adjustment thereon, selectively; said mounting means comprising a vertical sleeve fixed with the bracket, the standard being turnable and slidable in the bracket, a vertically adjustable collar secured on the standard and engaging the top of the sleeve, and a locating dowel depending from the collar and normally detachably engaged in a seat in the bracket to then prevent rotation of the collar and standard and then maintaining the guard unit in an operative position relative to the saw.

2. A guard structure for a circular table saw which projects upwardly from the table a predetermined distance from one edge of the table, said structure including a guard unit over the projecting portion of the saw, and means supporting the unit from the table; said means comprising a cylindrical arm projecting across and above the table rearwardly of the saw, means supporting the arm at one end from the table, a bar projecting forwardly from the arm and substantially overlying the saw, a post secured to and depending from the bar and connected at its lower end to the guard unit, a sleeve on the rear end of the bar turnable and slidable on the arm, a sleeve-confining unit on the arm limiting movement of the sleeve along the arm, and cooperating elements on said confining unit arranged to prevent rotation of the sleeve when the guard unit is in an operative position relative to the saw, and allowing of such rotation of the sleeve sufficient to dispose the bar in an upwardly and rearwardly angled position above the arm subsequent to a sliding movement of the sleeve along the arm sufficient to move the guard unit laterally clear of the saw.

3. A guard structure for a circular table saw which projects upwardly from the table a predetermined distance, said structure including a bar extending lengthwise of the table above the same and the saw in a plane laterally adjacent the saw, said bar having a flat face on one side, a clamping unit having a flat base plate which slidably engages the flat face of the bar for movement lengthwise thereof, a vertical post slidably engaging the base plate on the opposite side for vertical movement relative thereto, a guard unit mounted on the lower end of the post, flanges projecting from the opposite sides of the base plate and engaging the edges of the bar and post in locating relationship, the bar and post having longitudinal slots disposed in intersecting relation, a double-ended stud secured in the base plate and projecting through the slots, and nuts on the outer ends of the stud engaging the bar and post.

References Cited in the file of this patent

UNITED STATES PATENTS

| | | |
|---|---|---|
| 261,090 | Grill | July 11, 1882 |
| 509,253 | Shields | Nov. 21, 1893 |
| 1,050,649 | Harrold et al. | Jan. 14, 1913 |
| 1,240,430 | Erickson | Sept. 18, 1917 |
| 1,311,508 | Harrold | July 29, 1919 |
| 1,616,478 | Watson | Feb. 8, 1927 |
| 1,879,280 | James | Sept. 27, 1932 |
| 1,904,005 | Masset | Apr. 18, 1933 |
| 1,993,219 | Merrigan | Mar. 5, 1935 |
| 2,007,887 | Tautz | July 9, 1935 |
| 2,804,892 | Peterson | Sept. 3, 1957 |
| 2,835,285 | Gardner | May 20, 1958 |

FOREIGN PATENTS

| | | |
|---|---|---|
| 13,574 of 1898 | Great Britain | June 17, 1898 |
| 22,104 of 1899 | Great Britain | Nov. 4, 1899 |
| 544,826 | Germany | Feb. 27, 1932 |